United States Patent
Inoue et al.

(10) Patent No.: US 6,414,825 B1
(45) Date of Patent: Jul. 2, 2002

(54) THIN FILM DEVICE, THIN FILM MAGNETIC HEAD AND MAGNETORESISTIVE ELEMENT

(75) Inventors: Toru Inoue; Koichi Terunuma, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/409,382

(22) Filed: Sep. 30, 1999

(30) Foreign Application Priority Data

Oct. 6, 1998 (JP) .......................................... 10-284341

(51) Int. Cl.$^7$ ................................................ G11B 5/39
(52) U.S. Cl. ....................................................... 360/320
(58) Field of Search ............................... 360/320, 317, 360/120, 126; 501/96.1, 96.4, 97.1, 98.4; 423/290, 291, 353

(56) References Cited

U.S. PATENT DOCUMENTS

| 4,711,807 A | * | 12/1987 | Yamamoto et al. |
| 4,806,498 A | * | 2/1989 | Fujii |
| 5,892,269 A | * | 4/1999 | Inoue et al. |
| 6,169,041 B1 | * | 1/2001 | Liu et al. |

FOREIGN PATENT DOCUMENTS

| EP | 0 352 333 A1 | * | 1/1990 |
| EP | 0 522 979 A1 | * | 1/1993 |
| JP | 58-122884 | * | 7/1983 |
| JP | 61-179523 | * | 8/1986 |
| JP | 1-169759 | * | 7/1989 |
| JP | 2-66747 | * | 3/1990 |
| JP | 5-129288 | * | 5/1993 |
| JP | A-5-205224 | | 8/1993 |
| JP | 6-274830 | * | 9/1994 |
| JP | 10-222816 | * | 8/1998 |

* cited by examiner

Primary Examiner—William Klimowicz
(74) Attorney, Agent, or Firm—Oliff & Berridge, PLC

(57) ABSTRACT

An object of the invention is to improve the thermal conductivity and the hardness of a first shield gap film and a second shield gap film. Another object is to improve the thermal conductivity while decreasing the stress. The first shield gap film and the second shield gap film are formed of an insulating film which includes at least one of BN, SiN or CN as the main component, a little Ar and oxygen. Higher thermal conductivity can be obtained by using the insulating film which includes at least one of BN, SiN, or CN so that the heat generated in an MR element can be effectively dissipated. In addition, including Ar improves the hardness so that excessive polishing can be suppressed at the time of forming the air bearing surface. Moreover, including oxygen decreases the stress and exfoliation of the first and the second shield gap films can be avoided.

7 Claims, 9 Drawing Sheets

THIN FILM DEVICE, THIN FILM MAGNETIC HEAD AND MAGNETORESISTIVE ELEMENT

BACKGROUND OF THE INVENTION

1. Field of the Invention

The invention relates to a thin film device comprising an insulating film, a thin film magnetic head formed of a pair of shield gap films which are made of an insulating film with a magnetoresistive element in between, and a magnetoresistive element on which an insulating film is partially formed.

2. Description of the Related Art

Today, a composite thin film magnetic head is widely used as a thin film magnetic head. The composite thin film magnetic head has a layered structure which includes a recording head with an inductive-type magnetic transducer for writing and a reproducing head with a magnetoresistive (also referred as MR in the followings) element for reading-out. For example, as a reproducing head, an MR element is sandwiched by a pair of shield films with a pair of shield gap films in between, is popular. Each shield gap film is provided for electrically isolating the MR element and each shield film, and is made of, for example, aluminum oxide ($Al_2O_3$) with high insulating characteristic.

In such thin film magnetic head, performance improvement in a reproducing head has been sought in accordance with improvement in surface recording density of a hard disk drive in recent years. Methods of increasing reproducing output of a reproducing head are: increasing amount of sense current flowing into an MR element; and shortening the MR height. The MR height is the length (height) between the end of the air bearing surface (the surface facing the recording medium) side and the end of the other side.

If the amount of sense current flown into the MR element is increased, however, Joule heat generated by the resistance increases resulting in a rise in the temperature of the MR element. As a result, reproducing output decreases and the MR element may not last long. Also, if the MR height is made shorter, Joule heat generated by the resistance increases resulting in a rise in the temperature of the MR element. Accordingly, reproducing output decreases and the life of the MR element becomes shorter. Therefore, it is necessary to suppress a rise in the temperature of the MR element when increasing sense current or shortening the MR height.

In the related art, however, each shield gap film, which directly has a contact with the MR element, is made of aluminum oxide with a low thermal conductivity so that the heat generated in the MR element can not be effectively transmitted to each shield film. As a result, the heat of the MR element can not be effectively dissipated. In other words, a rise in the temperature of the MR element can not be suppressed so that the amount of sense current and the MR height are limited. Therefore, reproducing output can not be sufficiently improved.

Recently, to solve this problem, it is proposed in Japanese Patent laid-open Hei 5-205224 to form each shield gap film with aluminum nitride (AlN) or boron nitride (BN) with high thermal conductivity.

However, if the shield gap films are formed of aluminum nitride or the like, the shield gap films are further etched compared to the shield films and the MR element at the time of forming the air bearing surface by polishing. It is because aluminum nitride and the like are lower in hardness compared to aluminum oxide. As a result, there becomes a concave area in the air bearing surface.

Further, aluminum nitride or the like has a larger residual stress compared to aluminum oxide. Accordingly, if the shield gap film is formed of aluminum nitride, it becomes easy to exfoliate.

The invention has been designed to overcome the foregoing problems. The first object of the invention is to provide a thin film device, a thin film magnetic head and a magnetoresistive element in which the thermal conductivity and the hardness of the insulating film are improved.

The second object of the invention is to provide a thin film device, a thin film magnetic head and a magnetoresistive element in which the thermal conductivity of the insulating film is improved while the stress is decreased.

SUMMARY OF THE INVENTION

A thin film device of the invention comprises an insulating film which includes nitride of at least one of aluminum, boron, silicon or carbon, and argon.

The thin film device of the invention comprises an insulating film which includes nitride of at least one of aluminum, boron, silicon or carbon, and argon. As a result, high thermal conductivity of the insulating film can be attained while higher hardness can also be attained compared to the case where argon is not included.

In a thin film device of the invention, for example, it is preferable that the insulating film includes argon within the range of 0.1 atomic % and 5.0 atomic %.

Another thin film device of the invention comprises an insulating film which includes nitride of at least one of aluminum, boron, silicon or carbon, and oxygen.

As another thin film device of the invention comprises an insulating film which includes nitride of at least one of aluminum, boron, silicon or carbon, and oxygen, high thermal conductivity of the insulating film can be attained while the stress is decreased compared to the case where oxygen is not included.

In another thin film device of the invention, at least part of oxygen included in the insulating film may be chemically combined to at least one of aluminum, boron, silicon, carbon or nitrogen.

In another thin film device of the invention, for example, it is preferable that the insulating film includes oxygen in the range of 1 atomic % and 25 atomic %, and more preferable to be in the range of 5 atomic % and 20 atomic %. It is most preferable that the insulating film includes oxygen in the range of 10 atomic % and 15 atomic %.

Furthermore, in another thin film device of the invention, the insulating film may include argon. In this case, high hardness of the insulating film can be attained.

A thin film magnetic head of the invention comprises: a magnetoresistive element; a first shield film and a second shield film placed to face each other with the magnetoresistive element in between to shield the magnetoresistive element; a first shield gap film provided between the first shield film and the magnetoresistive element; and a second shield gap film provided between the second shield film and the magnetoresistive element. In the thin film magnetic head, at least part of at least either the first shield gap film or the second shield gap film is formed of an insulating film which includes nitride of at least one of aluminum, boron, silicon or carbon, and argon.

In another thin film magnetic head of the invention, at least part of at least either the first shield gap film or the second shield gap film is formed of an insulating film which includes nitride of at least one of aluminum, boron, silicon or carbon, and argon. As a result, the thermal conductivity and the hardness of at least either the first shield gap film or the second shield gap film are improved. Therefore, the heat generated in the magnetoresistive element by sense current flown into the magnetoresistive element at the time of reading out information is effectively dissipated through the first shield gap film and the second shield gap film. In addition, excessive polishing of the first shield gap film and the second shield gap film can be avoided at the time of controlling the length of the magnetoresistive element by polishing.

Another thin film magnetic head of the invention comprises: a magnetoresistive element; a first shield film and a second shield film placed to face each other with the magnetoresistive element in between to shield the magnetoresistive element; a first shield gap film provided between the first shield film and the magnetoresistive element; and a second shield gap film provided between the second shield film and the magnetoresistive element. In the thin film magnetic head, at least part of at least either the first shield gap film or the second shield gap film is formed of an insulating film which includes nitride of at least one of aluminum, boron, silicon or carbon, and oxygen.

In another thin film magnetic head of the invention, at least part of at least either the first shield gap film or the second shield gap film is formed of an insulating film which includes nitride of at least one of aluminum, boron, silicon or carbon, and oxygen. As a result, the thermal conductivity of at least either the first shield gap film or the second shield gap film is improved while the stress is decreased. Therefore, the heat generated in the magnetoresistive element by sense current flown into the magnetoresistive element at the time of reading out information is effectively dissipated through the first shield gap film and the second shield gap film. In addition, exfoliation of the first shield gap film and the second shield gap film can be suppressed.

In another thin film magnetic head of the invention, argon may be further included in at least part of at least either the first shield gap film or the second shield gap film. In this case, thermal conductivity of the first and the second shield gap films can be increased.

A magnetoresistive element of the invention has an insulating film at least partially formed on it. The insulating film includes nitride of at least one of aluminum, boron, silicon or carbon, and argon.

In the magnetoresistive element of the invention, the insulating film includes nitride of at least one of aluminum, boron, silicon or carbon, and argon. As a result, the thermal conductivity and the hardness of the insulating film are improved. Therefore, the heat generated in the magnetoresistive element is effectively dissipated through the insulating film and the magnetoresistive element can be easily manufactured.

Another magnetoresistive element of the invention has an insulating at least partially formed on it. The insulating film includes nitride of at least one of aluminum, boron, silicon or carbon, and oxygen.

In the magnetoresistive element of the invention, the insulating film includes nitride of at least one of aluminum, boron, silicon or carbon, and oxygen. As a result, the thermal conductivity of the insulating film is improved while the stress is decreased. Therefore, the heat generated in the magnetoresistive element is effectively dissipated through the insulating film and exfoliation of the insulating film can be avoided.

In another magnetoresistive element of the invention, the insulating film may further include argon. In this case, the hardness of the insulating film can be increased.

Other and further objects, features and advantages of the invention will appear more fully from the following description.

DETAILED DESCRIPTION OF THE PREFERRED EMBODIMENTS

In the followings, preferred embodiments of the invention will be described in detail with reference to the accompanied drawings.

Figure 1A:
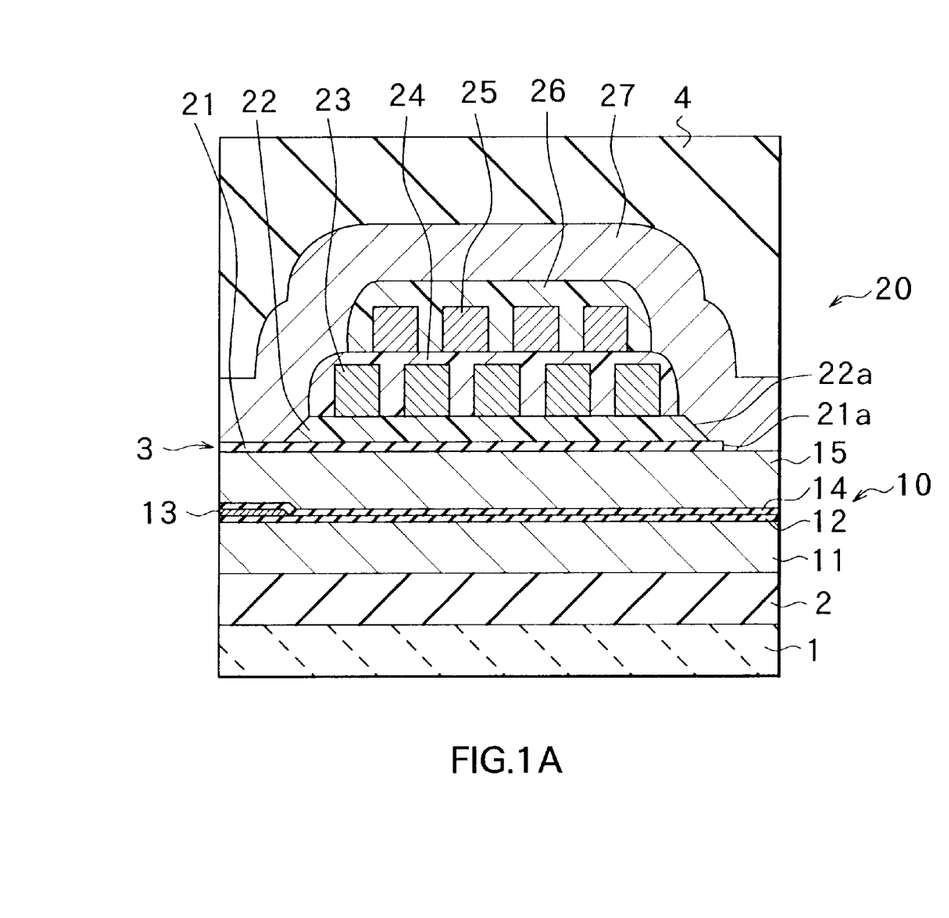
FIGS. 1A and 1B are cross sections showing a configuration of a thin film magnetic head according to the embodiment of the invention.
Figure 1B:
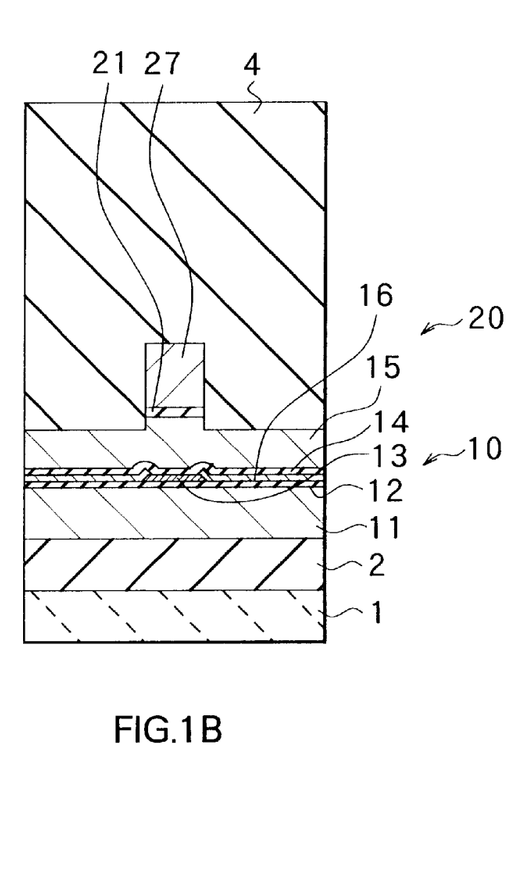
Figure 2:
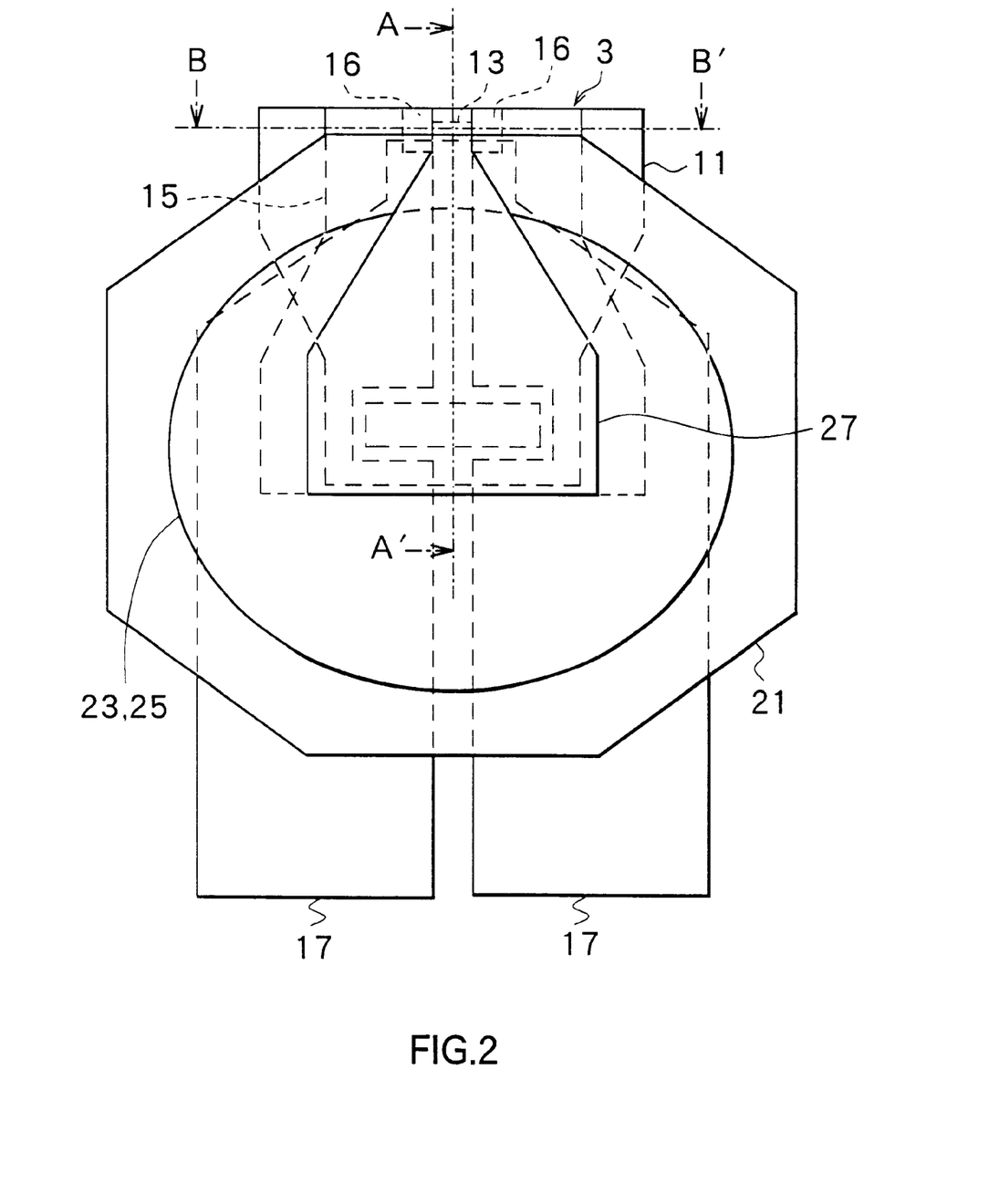
FIG. 2 is a plan view showing the configuration of the thin film magnetic head shown in FIGS. 1A and 1B.

FIGS. 1A and 1B show a cross sectional configuration of a thin film magnetic head according to embodiment of the invention, while FIG. 2 shows a plane configuration of the thin film magnetic head shown in FIGS. 1A and 1B. FIG. 1A shows a cross section taken along a line A–A' shown in FIG. 2, which is vertical to the air bearing surface, and FIG. 1B shows a cross section taken along a line B-B' shown in FIG. 2, which is parallel to the air bearing surface of the pole portion.

This thin film magnetic head has a configuration in which a reproducing head 10 for reading-out and a recording head 20 for writing are stacked on one surface (top surface in FIGS. 1A and 1B) of a substrate 1 with an insulating film 2 in between. The substrate 1 is made of a combined material ($Al_2O_3$ . TiC) which includes, for example, aluminum oxide and titanium carbide (TiC). The insulating film 2 has a thickness in the stacking direction (referred as a thickness in the followings) of about 1 to 10 $\mu$m, and is made of an insulating material such as aluminum oxide.

The reproducing head 10 has a configuration in which a first shield film 11, a first shield gap film 12, an MR element 13, a second shield gap film 14 and a second shield film 15 are stacked in order from the insulating film 2 side. The first shield film 11 and the second shield film 15 are for magnetically shielding the MR element 13 and are placed to face each other sandwiching the MR element 13 in between. The first shield film 11 has a thickness of about, for example, 0.5 to 3 $\mu$m and is made of a magnetic material such as alloy (NiFe alloy) of nickel (Ni) and iron (Fe).

The second shield film 15 has a thickness of about, for example, 3 $\mu$m and is made of a magnetic material such as NiFe alloy or ferrous nitride (FeN). The second shield film 15 may have a single-layered structure or a structure in which a plurality of films made of different materials are stacked. The second shield film 15 also works as a first magnetic pole of the recording head 20.

The first shield gap film 12 and the second shield gap film 14 are for electrically isolating the first shield film 11 and the second shield film 15 from the MR element 13. For example, the first shield gap film 12 and the second shield gap film 14 have a thickness of about 10 to 100 nm and are made of an insulating film which includes at least one of nitride of aluminum, boron, silicon, or carbon as the main component. These nitride are the insulating materials which have high thermal conductivity so that the heat generated in the MR element 13 can be effectively dissipated. Accordingly, the heat generated in the MR element 13 is effectively dissipated.

Moreover, it is preferable that each of the insulating films forming the first shield gap film 12 and the second shield gap film 14 includes a little amount of argon in addition to nitride as the main component so as to improve the hardness. As a result, excessive polishing of the first shield gap film 12 and the second shield gap film 14 can be avoided when, for example, forming the air bearing surface 3 by polishing.

It is preferable that the content of argon in each insulating film falls within the range of 0.1 atomic % and 5.0 atomic %. If the content of argon is less than 0.1 atomic %, the hardness does not become high enough. On the contrary, if the content of argon is more than 5.0 atomic %, the hardness goes down.

Further, it is preferable that each insulating film forming the first shield gap film 12 and the second shield gap film 14 include oxygen (O) in addition to aluminum nitride. The reason is because the compressive stress of these nitride, which is large, can be decreased by adding oxygen. Accordingly, exfoliation of the first shield gap film 12 and the second shield gap film 14 can be suppressed. Oxygen may be included by chemically combined to at least either aluminum, boron, silicon, nitrogen, or carbon, or by not chemically combined to any of them.

It is preferable that the content of oxygen in each insulating film falls within the range of 1 atomic % and 25 atomic %, and is more preferable that it falls within the range of 5 atomic % and 20 atomic It is most preferable that it falls within the range of 10 atomic % and 15 atomic %. If the content of oxygen is less than 1 atomic %, the stress can not be sufficiently decreased. On the contrary, if the content of oxygen is more than 25 atomic %, the thermal conductivity goes down.

The MR element 13 is for reading out information written on a magnetic recording medium (not shown) and is placed on the air bearing surface 3 side. As the MR element 13, there are an AMR element using anisotropic magnetoresistive (referred as AMR in the followings) effect, and a GMR element using giant magnetoresistive (referred as GMR in the followings) effect. The MR element 13 may be formed of either one of them.

For example, an AMR element comprises an AMR film having an AMR effect. The AMR film has, for example, a single-layered structure made of a magnetic material which exhibits an MR effect. On the other hand, a GMR element comprises a GMR film having a GMR effect. The GMR film has, for example, a multi-layered structure in which a plurality of films are stacked. The layered structure depends on the mechanism in which the GMR effect generates. For example, as a GMR film there are a superlattice GMR film, a spin valve film, and a granular film. The reproducing output using the GMR element is three to five times higher than using the AMR effect. It is because the GMR film exhibits a greater change in resistance compared to the AMR film under a specific external magnetic field.

An MR height is about, for example, 0.1 to 2.0 $\mu$m. The MR height is one factor for determining the reproducing output, and the reproducing output increases as it becomes shorter. When the MR height is too short, however, the reproducing output decreases because of a rise in the temperature of the MR element 13 while the life of the MR element 13 becomes shorter. Therefore, it is preferable that the MR height is short to a degree which is not influenced by a rise in the temperature. The thickness of the MR element 13 is, for example, tens of nanometers.

A pair of electrode films 16 placed to sandwich the MR element 13 in between are electrically connected to the MR element 13, respectively. Each of the electrode films 16 is formed in between the first shield gap film 12 and the second shield gap film 14 as the MR element 13. Each electrode film 16 has a thickness of about, for example, tens to hundreds of nanometers, and has a structure in which a permanent magnet film and a conductive film are stacked. For example, the permanent magnet film is made of alloy (CoPt) of cobalt (Co) and platinum (Pt), and the conductive film is made of tantalum (Ta).

Each of lead electrode films 17 are electrically connected to each of the electrode films 16 on the opposite side of the air bearing surface 3 (see FIG. 2). The electrode films 17 are extended from the electrode films 16 towards the opposite side of the air bearing surface 3, and are formed in between the first shield gap film 12 and the second shield gap film 14 in the same manner as the electrode films 16 are formed. The lead electrode films 17 have a thickness of about, for example, 50 to 100 nm, and are made of copper (Cu).

The recording head 20 has a configuration in which a write gap 21, a photoresist 22, a thin film coil 23, a photoresist 24, a thin film coil 25, a photorsist 26 and a second magnetic pole 27 are stacked in this order from the second shield film (the first magnetic pole) 15 side. The write gap 21 has a thickness of about, for example, 0.1 to 0.5 µm, and is made of an insulating material such as aluminum oxide. The write gap 21 comprises a contact hole 21a in the center area of the thin film coils 23 and 25, through which the second shield film 15 and the second magnetic pole 27 are in contact and magnetically coupled to each other.

The photoresist 22 determines the throat height and has a thickness of about, for example, 1.0 to 5.0 µm. The photoresist 22 is placed to have a little space in between the air bearing surface 3. The second magnetic pole 27 is in contact with the write gap 21 in the area adjacent to the air bearing surface 3. The photoresist 22 comprises a contact hole 22a in a location corresponding to the contact hole 21a of the write gap 21 so as to make the second shield film 15 contact with the second magnetic pole 27. The thin film coils 23 and 25 have a thickness of about, for example, 3 µm, and are placed in a location corresponding to the photoresist 22, respectively. The photoresist 24 and the photoresist 26 are for maintaining the insulating characteristic of the thin film coils 23 and 25, and are placed in a location corresponding to the thin film coils 23 and 25.

The second magnetic pole 27 has a thickness of about, for example, 3 µm, and is made of a magnetic material such as NiFe alloy or ferrous nitride. The second magnetic pole 27 is extended from the air bearing surface 3 to the center area of the thin film coils 23 and 25, and it has a contact with the write gap 21 adjacent to the air bearing surface 3. In the meantime, the second magnetic pole 27 is in contact with the second shield film 15 in the center area of the thin film coils 23 and 25 to be magnetically coupled.

At the air bearing surface 3, the second magnetic pole 27, the write gap 21 and the second shield film 15 form so-called a trim structure. This structure is effective for suppressing an increase in the effective track width due to spread of the magnetic flux generated at the time of writing of the narrow track.

An overcoat layer 4 is formed to cover the whole surface of the recording head 20 on the opposite side (upper side in FIG. 1A and 1B) of the reproducing head 10. The overcoat layer 4 has a thickness of, for example 20 to 30 µm, and is made of an insulating material such as aluminum oxide. The overcoat layer 4 is omitted in FIG. 2.

The thin film magnetic head having such configuration can be manufactured as described in the followings.

FIGS. 3A, 3B to FIGS. 9A, 9B show each step of manufacturing the thin film magnetic head. In FIGS. 3A, 3B to FIGS. 9A, 9B, "A" shows a cross section taken along a line A–A' vertical to the air bearing surface shown in FIG. 2, while 'B' shows a cross section taken along a line B–B' parallel to the air bearing surface 3 of the pole portion shown in FIG. 2.

Figure 3A:
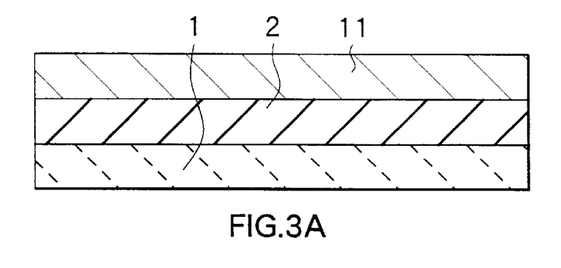
FIGS. 3A and 3B are cross sections showing a step of manufacturing a thin film magnetic head shown in FIGS. 1A and 1B.
Figure 3B:
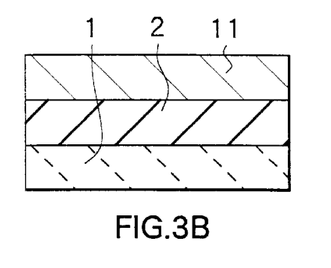

First, as shown in FIGS. 3A and 3B, for example, an insulating film 2 made of an insulating material such as aluminum oxide is formed on a substrate 1 made of a combined material including such as aluminum oxide and titanium carbide by, for example, sputtering. Then, a first shield film 11 made of a magnetic material such as NiFe alloy is selectively formed on the insulating film 2 by, for example, sputtering.

Figure 4A:
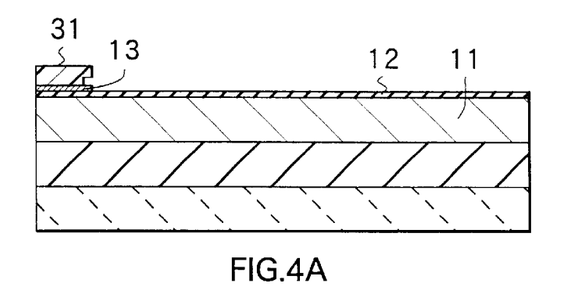
FIGS. 4A and 4B show cross sections showing a manufacturing step following the step shown in FIGS. 3A and 3B.
Figure 4B:
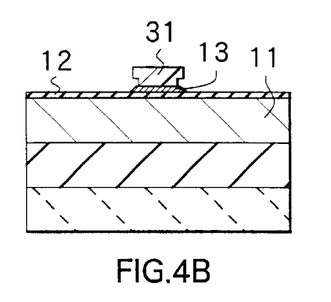

As shown in FIGS. 4A and 4B, a first shield gap film 12 made of an insulating film, which includes nitride of at least one of aluminum, boron, silicon or carbon as the main component, is formed on the first shield film 11 by, for example, sputtering. At this time, the first shield gap film 12 may be formed of an insulating film which includes argon in addition to aluminum nitride, which is the main component by inserting argon into the atmosphere inside the device. Further, the first shield gap film 12 may be formed of an insulating film which includes oxygen in addition to aluminum nitride which is the main component by inserting oxygen into the atmosphere inside the device.

After forming the first shield gap film 12, as shown in FIGS. 4A and 4B, an MR film for forming an MR element 13 is formed thereon by, for example, sputtering. After forming the MR film, a photoresist pattern 31 is selectively formed thereon in a location where the MR element 13 is to be formed. At this time, the photoresist pattern 31 is formed to have, for example, a T-shaped cross section so that lift-off can be easily performed. Then, the MR element 13 is formed through etching the MR film by, for example, ion milling using the photoresist pattern 31 as a mask.

Figure 5A:
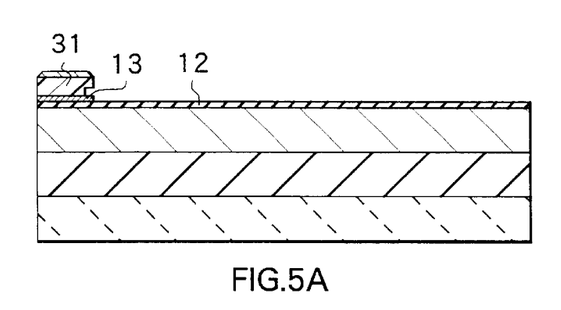
FIGS. 5A and 5B show cross sections showing a manufacturing step following the step shown in FIGS. 4A and 4B.
Figure 5B:
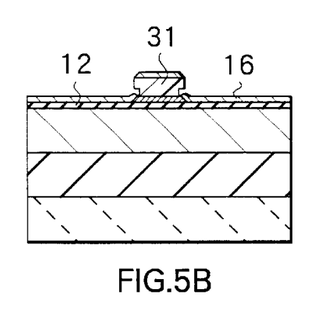

After forming the MR element 13, as shown in FIGS. 5A and 5B, each electrode film 16 is selectively formed on the first shield gap film 12 by, for example, sputtering using the photoresist pattern 31 as a mask. The electrode films 16 are formed by stacking, for example, a permanent magnet film made of CoPt alloy and a conductive film made of tantalum, respectively.

Figure 6A:
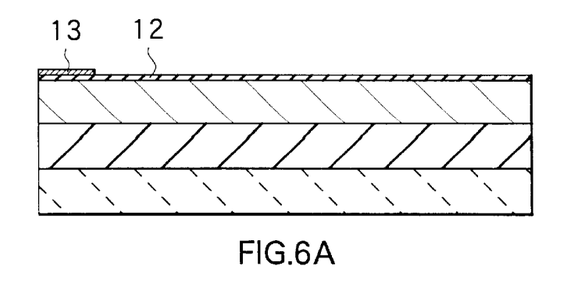
FIGS. 6A and 6B show cross sections showing a manufacturing step following the step shown in FIGS. 5A and 5B.
Figure 6B:
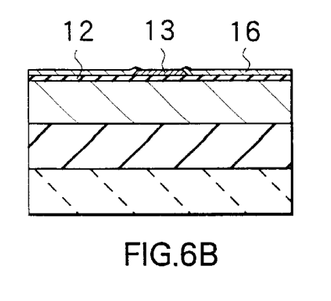

After forming the electrode films 16, as shown in FIGS. 6A and 6B, the photoresist pattern 31 is lifted off. Then, although not shown in FIGS. 6A and 6B, each lead electrode film 17 (FIG.2) made of copper is selectively formed on the first shield gap film 12 by, for example, sputtering.

Figure 7A:
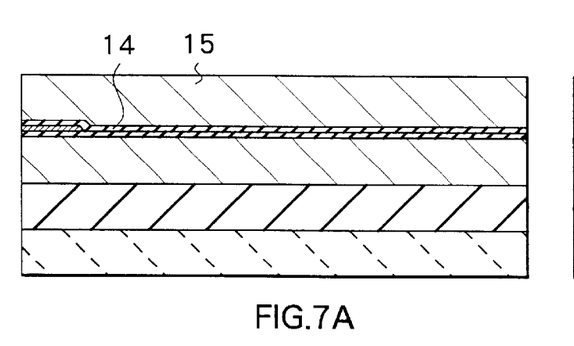
FIGS. 7A and 7B show cross sections showing a manufacturing step following the step shown in FIGS. 6A and 6B.
Figure 7B:
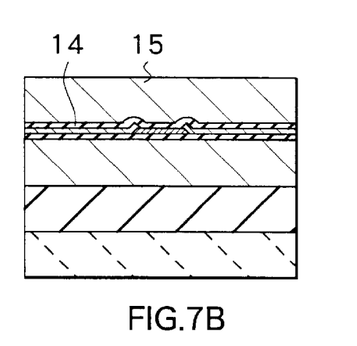

After forming each of the lead electrode films 17, as shown in FIGS. 7A and 7B, a second shield gap film 14 is formed on the first shield gap film 12, the MR element 13, each electrode film 16 and each lead electrode film 17 in the same manner as the first shield gap film 12 is formed. Then, a second shield film 15 made of a magnetic material such as NiFe alloy or ferrous nitride is selectively formed on the second shield gap film 14 by, for example, sputtering.

Figure 8A:
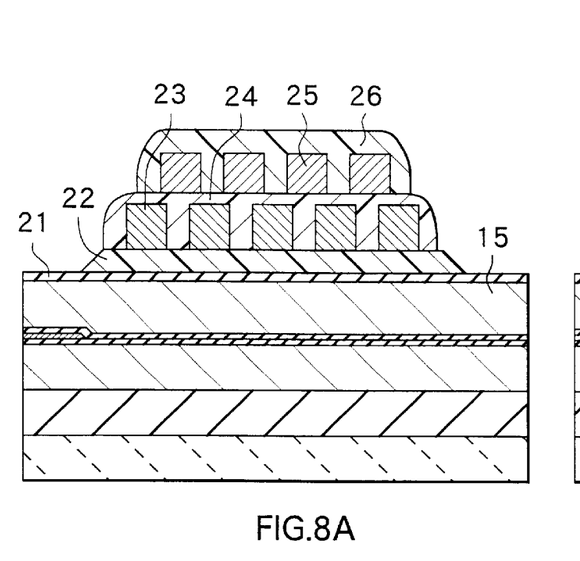
FIGS. 8A and 8B show cross sections showing a manufacturing step following the step shown in FIGS. 7A and 7B.
Figure 8B:
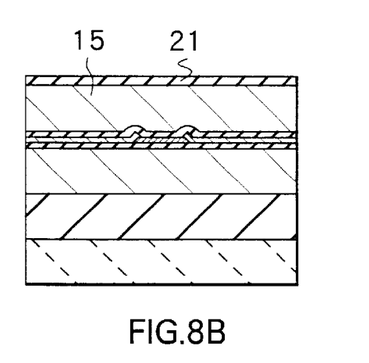

After forming the second shield film 15, as shown in FIGS. 8A and 8B, a write gap 21 made of an insulating material such as aluminum oxide is formed thereon by, for example, sputtering. Then, a photoresist 22 is selectively formed on the write gap 21 by lithography technique. Next, a thin film coil 23 is selectively formed on the photoresist 22 by, for example, sputtering. Then, a photoresist 24 is selectively formed on the photoresist 22 and the thin film coil 23 in the same manner as the photoresist 22 is formed, and a thin film coil 25 is selectively formed thereon in the same manner as the thin film coil 23 is formed. Then, a photoresist 26 is selectively formed on the photoresist 24 and the thin film coil 25 in the same manner as the photoresist 22 is formed.

Figure 9A:
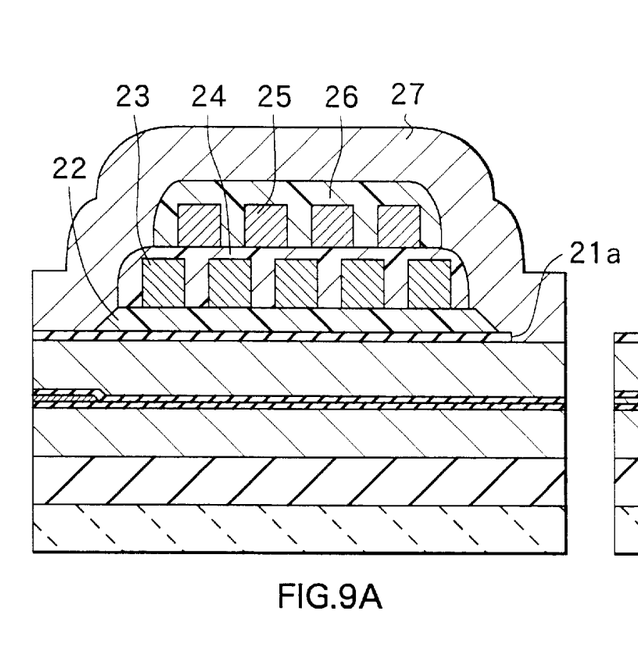
FIGS. 9A and 9B show cross sections showing a manufacturing step following the step shown in FIGS. 8A and 8B.
Figure 9B:
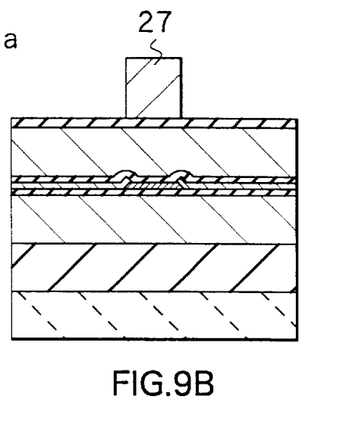

After forming the photoresist 26, as shown in FIGS. 9A and 9B, a contact hole 21a is formed in the center area of the thin film coils 23 and 25 by partially etching the write gap 21. Then, a second magnetic pole 27 made of a magnetic material such as NiFe alloy or ferrous nitride is selectively formed on the write gap 21, the photoresists 22, 24 and 26 by, for example, sputtering.

After forming the second magnetic pole 27, par t of the write gap 21 and the second shield film 15 are etched by, for example, ion milling using the second magnetic pole 27 as a mask. Then, an overcoat layer 4 made of aluminum oxide is formed on the second magnetic pole 27 by, for example, sputtering. At last, an air bearing surface 3 of a recording head 20 and a reproducing head 10 is formed by performing a machine processing on the slider. At this time, the first shield gap film 12 and the second shield gap film 14 are formed of an insulating film which includes at least one of nitride of aluminum, boron, silicon, or carbon and argon so as to improve their hardness. Accordingly, the first shield gap film 12 and the second shield gap film 14 can be prevented from exceedingly polished at the time of machine processing. Thereby, a thin film magnetic head shown in FIGS. 1A and 1B is completed.

In a thin film magnetic head manufactured as described, information is recorded on a magnetic recording medium (not shown) by generating magnetic flux for writing through flowing electric current into the thin film coils 23 and 25 of the recording head 20. On the other hand, information recorded on the magnetic recording medium (not shown) is read out by detecting magnetic flux leaked from the magnetic recording medium (not shown) through flowing sense current into the MR element 13 of the reproducing head 10.

At this time, Joule heat is generated in the MR element 13 by sense current. The first shield gap film 12 and the second shield gap film 14 include nitride of at least one of aluminum, boron, silicon or carbon as the main component so that they have a high thermal conductivity. As a result, the heat generated in the MR element 13 is effectively transmitted to the first shield film 11 and the second shield film 15 through the first shield gap film 12 and the second shield gap film 14, and is effectively dissipated. Accordingly, a rise in the temperature of the MR element 13 is suppressed. In other words, reproducing output is improved and the life of the MR element 13 is extended.

In the thin film magnetic head, if the first shield gap film 12 and the second shield gap film 14 are formed of an insulating film which includes oxygen in addition to nitride which is the main component, the compressive stress of the first and the second shield gap films 12 and 14 is decreased. As a result, exfoliation of the first shield gap film 12 and the second shield gap film 14 is avoided. In the mean time, the qualities of the first and the second shield gap films 12 and 14 are improved while the lives are extended.

As described, in the thin film magnetic head according to the embodiment, the first shield gap film 12 and the second shield gap film 14 are formed of an insulating film which includes nitride of at least one of aluminum, boron, silicon or carbon, and argon. As a result, the thermal conductivity and the hardness of the first and the second shield gap film 12 and 14 can be improved. Therefore, the heat generated in the MR element 13 at the time of reading-out can be effectively transmitted to the first shield film 11 and the second shield film 15 through the first shield gap film 12 and the second shield gap film 14 to be dissipated. Accordingly, a rise in the temperature of the MR element 13 can be suppressed. In the mean time, reproducing output can be improved while the life of the MR element 13 is extended. Also, excessive polishing of the first shield gap film 12 and the second shield gap film 14 can be avoided at the time of forming the air bearing surface 3 by polishing.

Furthermore, the first shield gap film 12 and the second shield gap film 14 are formed of an insulating film which includes nitride of at least one of aluminum, boron, silicon or carbon, and oxygen so that the thermal conductivity can be improved while the compressive stress can be decreased. As a result, a rise in the temperature of the MR element 13 can be suppressed. In the mean time, reproducing output can be improved while the life of the MR element 13 is extended. Moreover, exfoliation of the first shield gap film 12 and the second shield gap film 14 can be avoided. At the same time, the quality is improved while the life can be extended.

EXAMPLES

Now, specific examples of the embodiment of the invention will be described.

First Example

In this example of the embodiment, three different types of insulating films were formed, respectively. The three insulating films were: an insulating film including aluminum nitride and argon; another insulating film including boron nitride; and the other insulating film including silicon nitride and argon. Then, the characteristics of the three different insulating films were examined.

First, a polycrystal insulating film which includes aluminum nitride as the main component and a little argon was formed on a test substrate by RF (Radio Frequency) magnetron sputtering. At this time, aluminum was used as a target and argon gas and nitrogen gas were inserted to the atmosphere inside the device. A plurality of the insulating films including different amount of argon were formed by changing the bias voltage which was applied.

Next, a polycrystal insulating film which includes boron nitride as the main component and a little argon was formed. At this time, a plurality of the insulating films including different amount of argon were also formed. Then, a plurality of insulating films which includes silicon nitride as the main component and a little amount of argon, which differs in amount, were also formed in the same manner as the other two described above were formed.

Figure 10:
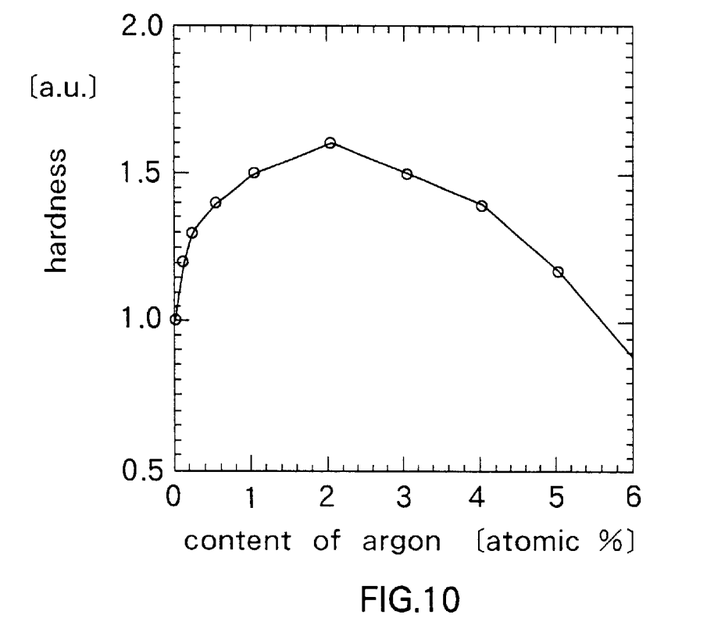
FIG. 10 is a characteristic figure showing the correlation of the amount of argon and the hardness in the case where the insulating film includes aluminum nitride as the main component in the first embodiment of the invention.
Figure 11:
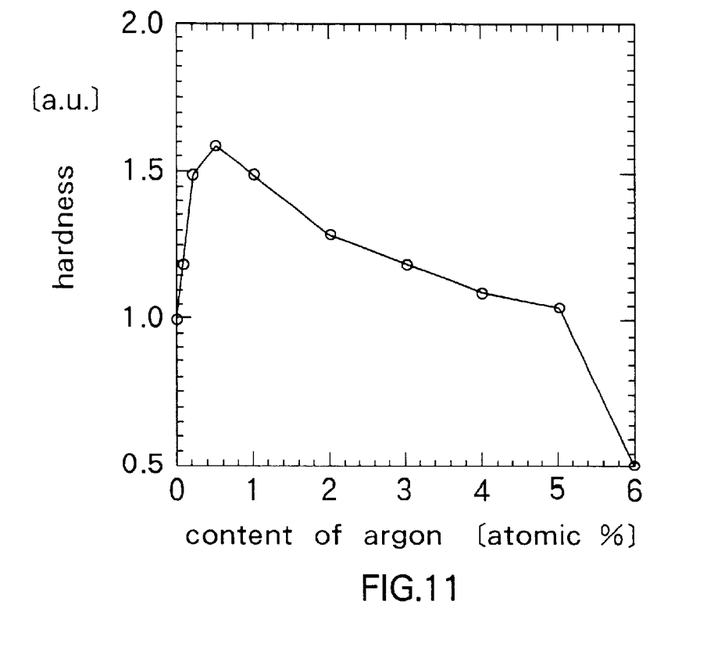
FIG. 11 is a characteristic figure showing the correlation of the amount of argon and the hardness in the case where the insulating film includes boron nitride as the main component in the first embodiment of the invention.
Figure 12:
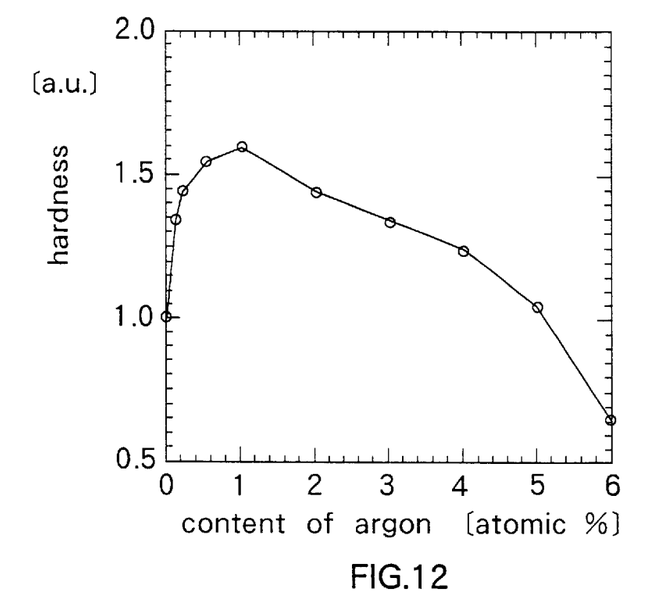
FIG. 12 is a characteristic figure showing the correlation of the amount of argon and the hardness in the case where the insulating film includes silicon nitride as the main component in the first embodiment of the invention.

The amount of argon included in each of the insulating films formed as described were measured by X-ray fluorescence analysis. The hardness of each of the insulating films were also measured by Vickers hardness measure. The correlation of the content of argon and the hardness is shown in FIG. 10 to FIG. 12. FIG. 10 is a characteristic figure of an insulating film which mainly includes aluminum nitride as the main component, and FIG. 11 is a characteristic figure of an insulating film which includes boron nitride as the main component, while FIG. 12 is a characteristic figure of an insulating film which includes silicon nitride as the main component. It can be seen from FIG. 10 to FIG. 12 that the hardness can not be made sufficient if the amount of argon is too little, and the hardness is decreased if the amount of argon is too much.

Specifically, it is preferable that the insulating film which includes aluminum nitride as the main component includes argon within the range of 0.1 atomic % and 5.0 atomic %. It is more preferable that the amount of argon falls within the range of 1.0 atomic % and 3.0 atomic % and most preferable that the amount falls within the range of 1.5 atomic % and 2.5 atomic %. Also, it is preferable that the insulating film which includes boron nitride as the main component includes argon within the range of 0.1 atomic % and 5.0 atomic %. It is more preferable that the amount of argon falls within the range of 0.1 atomic % and 3.0 atomic % and most preferable that the amount falls within the range of 0.2 atomic % and 1.0 atomic %. Further, it is preferable that the insulating film which includes silicon nitride as the main component includes argon within the range of 0.1 atomic % and 5.0 atomic %. It is more preferable that the amount of argon falls within the range of 0.2 atomic % and 3.0 atomic % and most preferable that the amount falls within the range of 0.5 atomic % and 1.5 atomic %.

Second Example

In this example of the embodiment, the first shield gap film 12 and the second shield gap film 14 were formed of an insulating film which includes nitride as the main component, and oxygen. Then, the characteristic of the reproducing head 10 described in the above-mentioned embodiment was examined. It will be described using identical numerals to the above-mentioned embodiment with reference to FIGS. 1A and 1B.

First, a first shield film 11 made of NiFe alloy of 2 μm in thickness was formed on a substrate 1 made of a combined material, which includes aluminum oxide and titanium carbide, by sputtering with an insulating film 2 made of aluminum oxide in between. Then, a first shield gap film 12 made of a polycrystal insulating film which includes oxygen in addition to nitride, which is the main component, was formed to a thickness of 70 nm on the first shield film 11 by RF magnetron sputtering. At this time, argon gas, nitrogen gas and oxygen gas were inserted into the atmosphere inside the device, and a plurality of the first shield gap films 12 which include different amount of oxygen were formed by changing the concentration of oxygen gas. Aluminum nitride, boron nitride and silicon nitride were respectively used as the main component included in the insulating films. At this time, the amount of oxygen included in each of the first shield gap films 12 was measured by X-ray fluorescence analysis.

Then, an MR element 13 was formed by selectively etching an alloy film of 12 nm in thickness made of nickel, ferrous and chrome (Cr), a tantalum film of 7.5 nm in thickness and a NiFe alloy film of 12 nm in thickness, which were laminated in order on the first shield gap film 12 by sputtering. After forming the MR element 13, each electrode film 16 is selectively formed by laminating a permanent magnet film made of CoPt alloy of 50 nm in thickness and a conductive film made of tantalum of 100 nm in thickness in order on the first shield gap film 12 by sputtering.

After forming each of the electrode films 16, each lead electrode film 17 made of copper of 100 nm in thickness was formed on the first shield gap film 12 by sputtering. After forming each of the lead electrode films 17, a second shield gap film 14 was formed on the first shield gap film 12, the MR element 13, each electrode film 16 and each lead electrode film 17 in the same manner as the first shield gap film 12 was formed.

After forming the second shield gap film 14, a second shield film 15 made of NiFe alloy was selectively formed thereon by sputtering. Then, an air bearing surface 3 was formed by performing machine processing on the slider. As a result, a plurality of reproducing heads 10 in which the first shield gap film 12 and the second shield gap film 14 include different amount of nitride and oxygen were completed.

First, the temperature coefficient of each MR element 13 in each of the reproducing heads 10 formed as described was obtained. Specifically, the temperature coefficient was obtained by raising the temperature of each reproducing head 10 by placing each of them in a heater and measuring changes in the resistance of the MR elements 13 by every specific temperature after flowing 1 mA of direct current, which is so small amount that increases in the temperature can be ignored.

Figure 13:
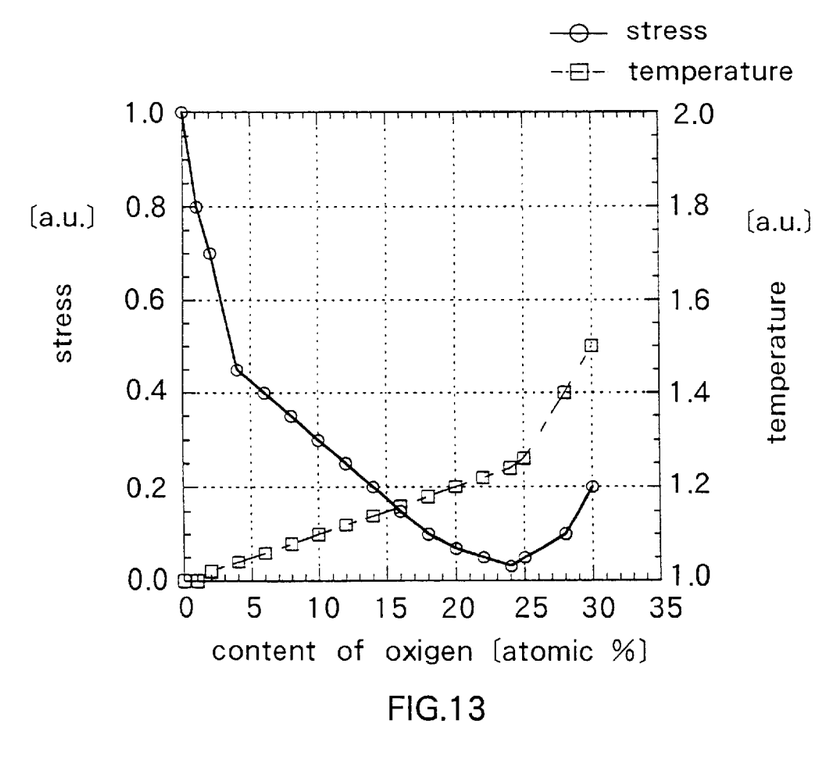
FIG. 13 is a characteristic figure showing the correlation of the amount of oxygen, the stress and the temperature of the MR element in the case where the insulating film includes aluminum nitride as the main component in the second embodiment of the invention.
Figure 14:
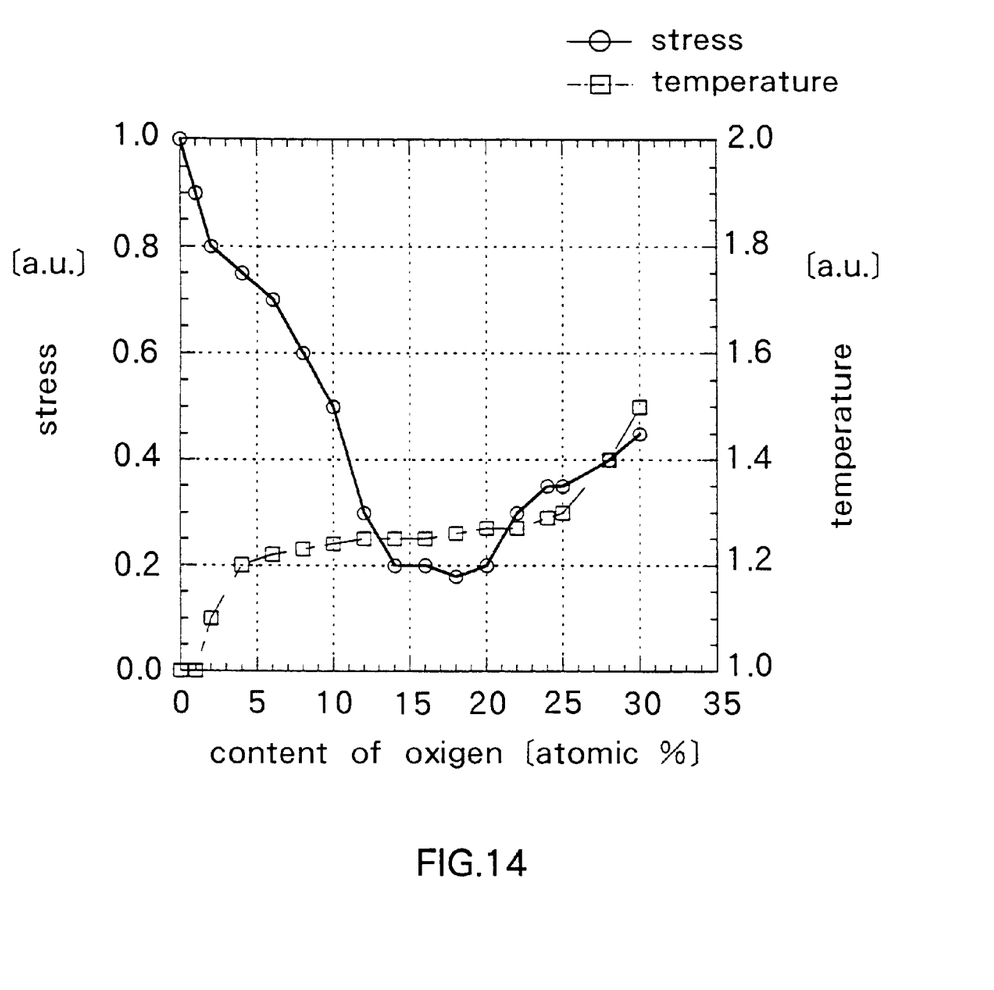
FIG. 14 is a characteristic figure showing the correlation of the amount of oxygen, the stress and the temperature of the MR element in the case where the insulating film includes boron nitride as the main component in the second embodiment of the invention.
Figure 15:
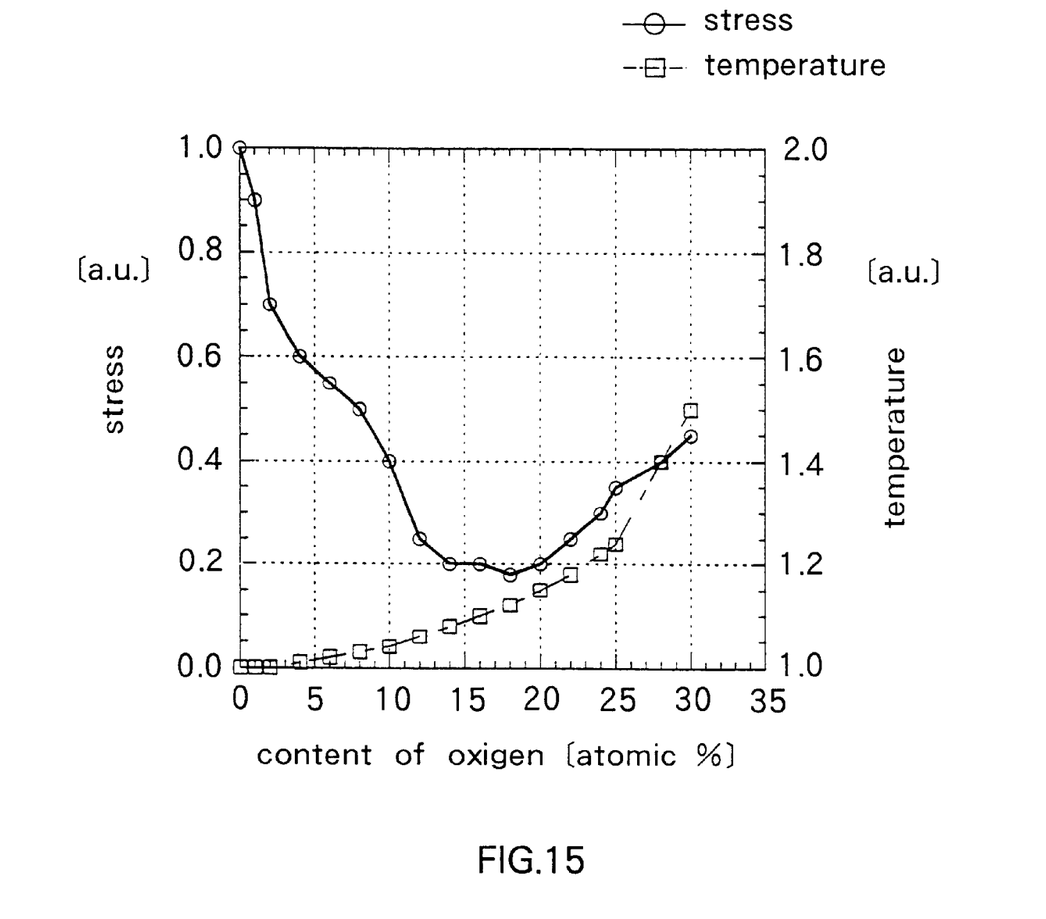
FIG. 15 is a characteristic figure showing the correlation of the amount of oxygen, the stress and the temperature of the MR element in the case where the insulating film includes silicon nitride as the main component in the second embodiment of the invention.

After flowing 10 mA sense current into the MR elements 13, changes in the resistance of the MR elements 13 in the reproducing heads 10 were measured, respectively. The temperature of each MR element 13 was obtained from this result and each temperature coefficient obtained earlier. The correlation of the content of oxygen and the temperature of the MR element 13 is shown in FIG. 13 to FIG. 15. FIG. 13 is a characteristic figure of an insulating film which includes aluminum oxide as the main component, and FIG. 14 is a characteristic figure of an insulating film which includes boron nitride as the main component while FIG. 15 is a characteristic figure of an insulating film which includes silicon nitride as the main component.

A polycrystal insulating film which includes oxygen in addition to nitride which is the main component was formed on a substrate made of silicon (Si) in the same manner as the first shield gap film 11 mentioned above was formed. At this time, a plurality of insulating films with different amount of oxygen were also formed. Then, the amount of oxygen included in each of the insulating film was measured by X-ray fluorescence analysis while the stress from the warp of the substrate was measured. The correlation of the amount of oxygen and the stress is also shown in FIG. 13 to FIG. 15.

It can be seen from FIG. 13 to FIG. 15 that the stress can not be sufficiently decreased if the content of oxygen is too low, and the thermal conductivity is decreased if the content of oxygen is too high. Specifically, it is clear that it is preferable that the content of oxygen by percentage falls within the range of 1 atomic % and 25 atomic %, and is more preferable that it falls within the range of 5 atomic % and 20 atomic %. It is most preferable that it falls with the range of 10 atomic % and 15 atomic %.

Although the invention is described by referring to the embodiment and each example, it is not limited to those but various modification can be applicable. For example, in the above-mentioned embodiment, three different cases to form the first shield gap film 12 and the second shield gap film 14 are desired by using three kinds of insulating films; one of the insulating films includes aluminum nitride as the main component, another includes boron nitride as the main component and the other includes silicon nitride as the main component. However, the same results can be obtained in the cases where the first and the second shield gap films are formed of an insulating film which includes carbon nitride as the main component, or of an insulating film which includes a plurality of nitride as the main component.

Furthermore, in the above-mentioned embodiment, the whole portion of the first shield gap film 12 and the second shield gap film 14 are formed of an insulating film which includes argon in addition to nitride which is the main component. However, at least part of at least either the first shield gap film 12 or the second shield gap film 14 may be formed of such insulating film. In addition, the same results can be obtained in the case where at least part of at least either the first or the second shield gap films is formed of an insulating film which includes oxygen in addition to nitride which is the main component.

In addition, in the above-mentioned embodiment, the case where the first shield gap film 12 and the second shield gap film 14 are made of such insulating films is described. However, the insulating film 2, the write gap 21, the photoresists 22, 24, 26 or the overcoat layer 4 may also be formed of such insulating films.

In addition, in the above-mentioned embodiment, the case where the invention is applied to a thin film magnetic head is described. However, the invention may be widely applied to thin film devices comprising an insulating film.

Furthermore, in the above-mentioned embodiment, a thin film magnetic head having a configuration in which a reproducing head 10 is formed on a substrate 1 side and a recording head 20 is formed thereon is described. However, the thin film magnetic head may have a configuration in which a recording head is formed on a substrate side and a reproducing head is formed thereon.

Moreover, in the above-mentioned embodiment, the case where a magnetoresistive element of the invention is applied to a thin film magnetic head is described. However, it is also widely applicable to, for example, an MR sensor for detecting acceleration.

As described, the thin film device of the invention is formed to comprise an insulating film which includes nitride of at least one of aluminum, boron, silicon or carbon, and argon. As a result, the thermal conductivity and the hardness of the insulating film can be improved. Therefore, the heat generated in the thin film device can be effectively dissipated and a rise in the temperature of the thin film device can be suppressed. Accordingly, processing of the thin film device becomes easier.

Further, a thin film device of the invention is formed to comprise an insulating film which includes nitride of at least one of aluminum, boron, silicon or carbon, and oxygen. As a result, the thermal conductivity is improved while the stress of the insulating film is decreased. Therefore, the heat generated in the thin film device can be effectively dissipated, and a rise in the temperature of the thin film device can be suppressed while exfoliation of the insulating film can be avoided. Accordingly, quality of the thin film device is improved and the life can be extended.

Furthermore, in the thin film magnetic head of the invention, at least part of at least either the first shield gap film or the second shield gap film is formed of an insulating film which includes nitride of at least one of aluminum, boron, silicon or carbon, and argon. As a result, the thermal conductivity and the hardness of at least either the first shield gap film or the second shield gap film can be improved. Therefore, the heat generated in the MR element at the time of reading can be effectively dissipated and a rise in the temperature of the MR element can be suppressed. Accordingly, reproducing output can be improved and the life can be extended. In addition, excessive polishing of the first shield gap film and the second shield gap film can be avoided at the time of forming the air bearing surface by machine processing.

Moreover, in the thin film magnetic head of the invention, at least part of at least either the first shield gap film or the second shield gap film is formed of an insulating film which includes nitride of at least one of aluminum, boron, silicon or carbon, and oxygen. As a result, the thermal conductivity of at least either the first shield gap film or the second shield gap film can be improved while the stress can be decreased. Therefore, the heat generated in the MR element at the time of reading can be effectively dissipated and a rise in the temperature of the MR element can be suppressed. Accordingly, reproducing output can be improved and the life can be extended. In addition, exfoliation of the first shield gap film and the second shield gap film can be suppressed. As a result, the quality is improved and the life can be extended.

In the magnetoresistive element of the invention, the insulating film is formed to include nitride of at least one of aluminum, boron, silicon or carbon, and argon. As a result, the thermal conductivity and the hardness of the insulating film can be improved. Therefore, the heat generated in the magnetoresistive element can be effectively dissipated and a rise in the temperature of the magnetoresistive element can be suppressed. Accordingly, processing of the magnetoresistive element becomes easier.

In addition, the magnetoresistive element of the invention, the insulating film is formed to include nitride of at least one of aluminum, boron, silicon or carbon, and oxygen. As a result, the thermal conductivity is improved while the stress of the insulating film is decreased. Therefore, the heat generated in the magnetoresistive element can be effectively dissipated and a rise in the temperature of the magnetoresistive element can be suppressed while exfoliation of the magnetoresistive element can be avoided. Accordingly, quality of the magnetoresistive element is improved and the life can be extended.

Obviously many modifications and variations of the present invention are possible in the light of the above teachings. It is therefore to be understood that within the scope of the appended claims the invention may be practiced otherwise than as specifically described.

What is claimed is:

1. A thin film device comprising an insulating film which includes nitride of at least one of boron, silicon or carbon; oxygen; and argon within a range of 0.1 atomic % to 5.0 atomic %.

2. A thin film device according to claim 1 wherein the insulating film includes at least portion of oxygen being chemically combined to at least one of boron, silicon, carbon or nitrogen.

3. A thin film device according to claim 1 wherein the insulating film includes oxygen within the range of 1 atomic % and 25 atomic %.

4. A thin film device according to claim 1 wherein the insulating film includes oxygen in the range of 5 atomic % and 20 atomic %.

5. A thin film device according to claim 1 wherein the insulating film includes oxygen in the range of 10 atomic % and 15 atomic %.

6. A thin film magnetic head comprising: a magnetoresistive element; a first shield film and a second shield film placed to face each other with the magnetoresistive element in between to shield the magnetoresistive element; a first shield gap film provided between the first shield film and the magnetoresistive element; and a second shield gap film provided between the second shield film and the magnetoresistive element; wherein:

at least part of at least either the first shield gap film or the second shield gap film is formed of an insulating film which includes nitride of at least one of boron, silicon or carbon; oxygen; and argon within a range of 0.1 atomic % to 5.0 atomic %.

7. A magnetoresistive element on which an insulating film is at least partially formed, wherein:

the insulating film includes nitride of at least one of boron, silicon or carbon; oxygen; and argon within a range of 0.1 atomic % to 5.0 atomic %.

* * * * *